United States Patent [19]

Backlund

[11] 4,341,075
[45] Jul. 27, 1982

[54] METHOD AND A DEVICE FOR ENERGY CONVERSION

[76] Inventor: Anders D. Backlund, S-820 90 Ytterhogdal, Holmen, Sweden

[21] Appl. No.: 112,896

[22] Filed: Jan. 17, 1980

[30] Foreign Application Priority Data

Jan. 17, 1979 [SE] Sweden .............................. 7900397

[51] Int. Cl.³ .............................................. F03G 7/06
[52] U.S. Cl. .............................................. 60/531
[58] Field of Search .......................... 60/527, 530, 531

[56] References Cited

U.S. PATENT DOCUMENTS

| | | | |
|---|---|---|---|
| 737,093 | 8/1903 | Fulton | 60/531 X |
| 3,732,040 | 5/1973 | Low | 60/531 X |
| 4,186,558 | 2/1980 | Kuo | 60/530 X |

*Primary Examiner*—Allen M. Ostrager
*Attorney, Agent, or Firm*—Steele, Gould & Fried

[57] ABSTRACT

A method and a device for converting low temperature heat energy into mechanical or electrical energy, wherein at least one liquid or gas chamber performs work in response to temperature variations. According to the invention one or more expansible and compressible containers are arranged in said chamber. Each container contains a refrigerant capable of shifting from liquid phase to gas phase, and vice versa, thereby producing or contributing the work of the working gas or liquid. The refrigerant is alternatingly heat exchanged with two sources of low temperature heat energy, for example ground accumulators, of different temperatures, thereby causing alternating expansion and contraction of said containers.

12 Claims, 5 Drawing Figures

METHOD AND A DEVICE FOR ENERGY CONVERSION

BACKGROUND OF THE INVENTION

The present invention relates to a method and a device for converting cheap and "unlimitedly" available low temperature heat energy into useful mechanical work, which e.g. can be utilized for producing electric energy, and/or high temperature heat energy.

I have previously developed various types of heating systems, wherein low temperature heat energy is taken mainly from solar energy stored in ground accumulators, e.g. such accumulators as are described in my Swedish Pat. No. 400,631, which is incorporated herein by reference. In such systems heat pumps are used for converting the stored low temperature heat energy to high temperature heat energy for heating purposes. A further development of these heating systems, e.g. described in my German "Offenlegungsschrift" No. 28 43 349 (corresponding to my copending U.S. Pat. Ser. application No. 946,238), which is also incorporated herein by reference, makes it possible to simultaneously convert the low temperature energy into mechanical-/electrical energy by utilizing the expansion work of the heat pumping device.

SUMMARY OF THE INVENTION

It is an object of the present invention to provide an improved method and apparatus for converting low temperature heat energy into useful energy forms such as mechanical and electrical energy. Such low temperature heat energy is available in practically infinite amounts, but it has so far found little use as an energy source because of the low "energy density" thereof. The invention provides a simple, efficient and economical technique for producing mechanical and electrical energy from low temperature heat energy, and preliminary studies indicate that such energy would be considerably cheaper than e.g. oil and nuclear power based energy production.

In accordance with the invention one or more bags or containers (or parts thereof) are arranged inside a chamber containing a working fluid (a liquid or a gas), which is arranged to perform mechanical work. This container can be expanded and compressed, and it contains a refrigerant shifting between liquid phase and gas phase in response to temperature variations during operation. Heating of the refrigerant by means of low temperature heat energy (e.g. taken from a ground accumulator of the type described in the above mentioned Swedish Pat. No. 400 631 or a similar device) causes (at least) partial evaporation of the refrigerant. This evaporation in turn makes the container expand, thereby causing the working fluid to perform work. Subsequent lowering of the temperature of the refrigerant (e.g. by means of a second ground accumulator operating at a lower temperature than the first accumulator) causes condensation of the refrigerant with resulting contraction of the container and a corresponding effect on the working fluid. The size and number of the bags or containers are very flexible, ranging from a plurality of very small "balls" to comparatively large containers.

BRIEF DESCRIPTION OF THE DRAWINGS

These and other objects, features and advantages of the invention will be explained in greater detail in the following description with reference to the drawings, wherein.

DETAILED DESCRIPTION OF THE PREFERRED EMBODIMENTS

Figure 1:
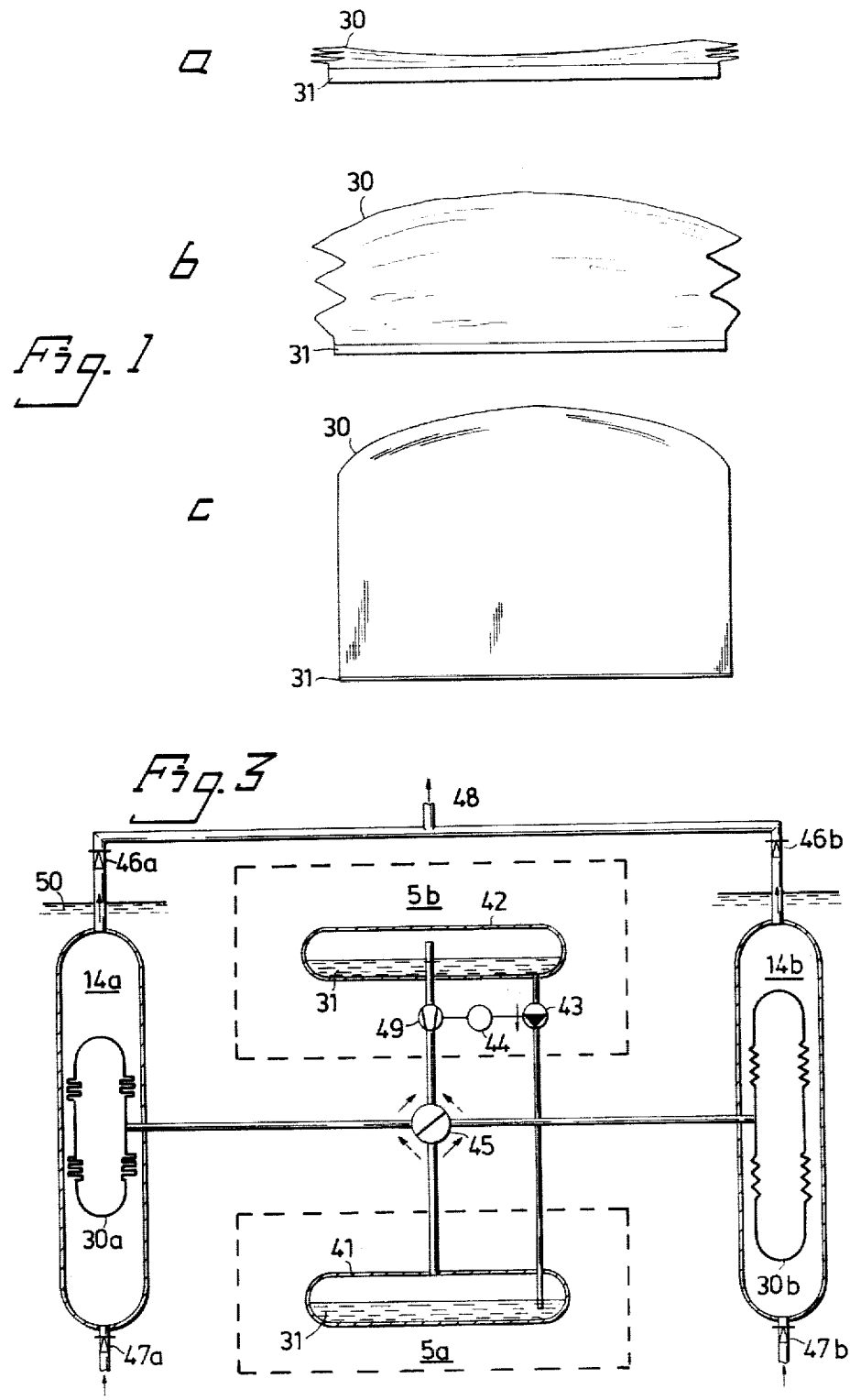
FIGS. 1a to 1c illustrate the principle of operation of the energy conversion device according to the invention, and FIGS. 2 and 3 schematically show two alternative embodiments of equipment for the conversion of low temperature heat energy into useful mechanical work using the improvement according to the invention.

With reference to the drawings, one example of such a closed, expansible and compressible container is schematically shown in FIGS. 1a to 1c. The container shown has essentially the form of a folded or gusseted bag 30, for example of a thin plastic material. Although it is preferred that the change of volume of the container 30 takes place without any essential resistance from the container itself or from the container material (as is, for example, the case with foled, gusseted or otherwise collapsible plastic bags, etc., other types of bellows devices, piston/cylinder devices, and so on), it is within the scope of the invention also possible to make use of elastically expansible containers such as rubber bladders. One or more such plastic bags, etc. are intended to be placed inside a chamber containing a working fluid, i.e. a liquid or gas performing work due to temperature variations, or alternatively in a space communicating with such a chamber. Each container 30 contains a refrigerant capable of undergoing phase change from liquid to gas, and vice versa, in response to pressure and/or temperature changes. In FIGS. 1a to 1c the liquid phase of the refrigerant is illustrated by the reference numeral 31. The specific refrigerant used is chosen with regard to the working pressure (the counter pressure) and the working temperature. The refrigerant preferably starts boiling just above the lowest working pressure and temperature level. For example, if said space is working at atmospheric pressure $+(-)10\%$ and the cooling temperature is about $-35°$ C., then it is advantageous to use the well known refrigerant $CF_2Cl_2$(R 12), which at said temperature boils at 0.82 atm. (atmosphere), i.e. only at 18% below the atmospheric pressure. At $-30°$ C. the pressure in the container 30 will then be 1.02 atm., i.e. 0.08 at below the working pressure). Thus, no evaporation of the refrigerant 31 has started, but the bag 30 is essentially "gas evacuated" and compressed/folded (see FIG. 2a). When the temperature of the space around the bag 30 is increased, e.g. by heat transfer from a ground accumulator (e.g. of about $0°$ C.) to the chamber surrounding the bag, the temperature of the refrigerant 31 also increases. At constant volume of the container 30 the vapor pressure would in this specific case be 1.86 atm. at $-15°$ C., 2.23 atm. at $-10°$ C., 2.66 atm. at $-5°$ C. and 3.15 atm. at $0°$ C. Since the surrounding working pressure is considerably lower (about 1.10 atm.) the volume of the container will increase considerably, thereby increasing the pressure on the surrounding liquid or gas. When the temperature decreases the reverse course takes place. Since the direct pressure on the space surrounding the container 30 can be exerted by air the pressure on the bag or container 30 itself becomes insignificant, i.e. there will be practically the same pressure inside as outside the bag. This means that a very thin material can be used for the container 30 for enclosing the refrigerant. It should be noticed that lower temperatures as well as increased temperatures can increase the efficiency. It is thus the temperature difference that is decisive. Related to the above mentioned specific example FIG. 2a could be regarded as showing the bag at about −30° C., FIG. 2b at about −15° C. and FIG. 1c at about 0° C. The magnitude of the work performed is then determined by the time for carrying out temperature changes and piston strokes. In order to obtain a more rapid evaporation of the refrigerant it is possible to heat the same more directly by means of as large heat exchange surfaces as possible. The same is true for the condensation step, wherein rapid cooling can be effected by means of fans and the like. Since the pressure differences are very small, thin walled tubes or other partition areas can be used for this purpose.

In a further aspect of the invention the heating and cooling of the refrigerant for producing the desired energy conversion is obtained by making use of the natural temperature variations present everywhere and available for simple use. It is then not necessary to combine the system with heat pumping devices (compressors, etc.) for obtaining the desired temperature differences. In such a separate energy conversion device it is possible to use, as energy sources of different temperature levels, for example three different accumulators (for example ground accumulators of high water contents according to my Swedish Pat. No. 400,631), a first accumulator—the "basic" accumulator—working at about 0° C. At this temperature large amounts of energy can be stored or withdrawn through the phase change water/ice. A second accumulator—the "summer" accumulator—is used together with the ambient air mass for having a lowest temperature of at least about +10° C. during the summer period. A third accumulator—the "winter" accumulator—is also used together with the air mass, but in this case for making use of the cold winter for providing an accumulator which is as cold as possible. In this accumulator the freezing point can be lowered—by the addition of freezing point depressing agents such as sodium chloride to the accumulator water—to about for example −10° C., said temperature thus being the normal working temperature of the winter accumulator. With these three accumulators there is provided a permanently available temperature difference between "unlimitedly" large energy stores, of which the basic accumulator serves as the energy delivering accumulator in winter time (water being frozen into ice) whereas it during the summar period is a receiver of energy (the ice then being melted).

In a variant of the invention, likely to find many practical applications, the expansible and compressible container 30 is surrounded by a liquid (such as water) in place of gas, the work being used for pumping the liquid. In this case the container 30 presses directly on the liquid, which can be contained in a closed space having suitable one-way valves for permitting the desired pumping of the liquid into suitable conduits. The pumping of the liquid, caused by the container 30, can then be utilized in a manner known per se for producing the desired form of energy such as electric energy. The liquid as such can in certain applications e.g. form the "warm accumulator" and the cooling can be effected by an air and/or liquid accumulator, as described above, for reducing the container volume (and therefore the intake stroke).

Figure 2:
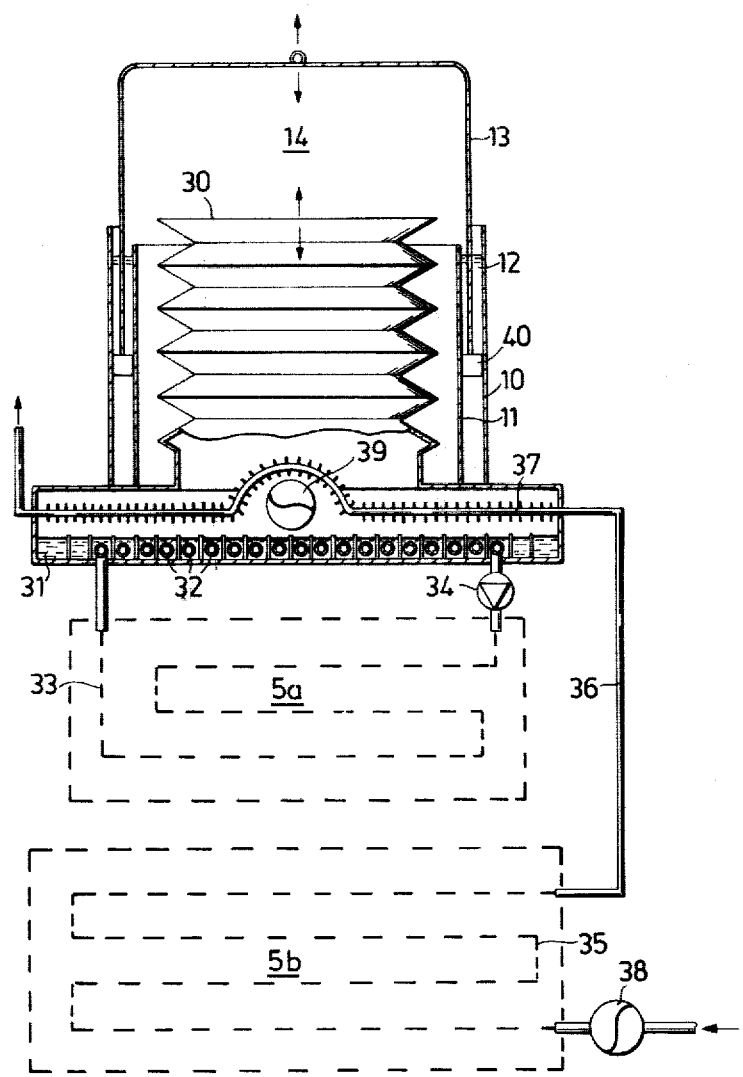

One example of an embodiment of an energy conversion device of this kind is shown in FIG. 2. The shown device comprises a gas bell 13, which e.g. may be the expansion chamber of a heat pumping device of the kind described in the above mentioned German "Offenlegungsschrift" No. 28 43 349. The bell or dome 13 is slidingly journalled in a sealing liquid 12 in a double walled container 10, 11 so as to form a closed chamber 14. The chamber 14 encloses an expansible and compressible container 30, which in the illustrated case has a bellows shaped portion projecting into the chamber 14. In analogy with FIG. 1 the container 30 contains a refrigerant, the liquid phase of which is marked by reference numeral 31. The system further comprises a first ground accumulator 5a, arranged to operate at a comparatively high temperature (normally about 0° C.), and a second accumulator 5b arranged to operate at a lower temperature than the accumulator 5a. The first accumulator 5a can be brought into heat exchanging contact with the refrigerant 31, which in the illustrated case just about covers heat exchange tubes 32 arranged in the container 30. The tubes 32 are connected to suitable conduits 33 which are in heat exchanging contact with the accumulator 5a. A circulation pump 34 provides for circulation of a heat carrying fluid through the tubes 32 and the conduits 33. The second accumulator 5b in heat exchanging contact with a suitable conduit 35, which in turn via an intermediate conduit 36 is connected to one or more conduits 37 located inside the container 30, said conduits in turn being in heat exchanging contact with the refrigerant of the container 30. The conduits 37 are in the illustrated case designed as finned tubes. A heat carrying fluid is circulated in the conduits 35, 36, 37 by means of a fan 38, and a second fan 39 provides for circulation inside the container 30. The above described device can, for example, be operated as follows:

The bearing pressure (i.e. the weight of the bell 13, possible ballast, and the working pressure) is preferably chosen to be comparatively high such as 3.6 atm., i.e. 2.6 kp/cm$^2$ above atmospheric pressure. It can then be necessary to make use of piston rings 40 or the like for sealing the bell 13. Under these conditions CHF$_2$Cl(R 22) is a suitable refrigerant. The amount of refrigerant is preferably minimized so that it at about 0° C. and with the bell 13 in the top position is sufficient for the bearing pressure. (With the bellows portion secured in the bottom position the vapor pressure at 0° C. would have been 4.1 kp/cm$^2$ above atmospheric pressure.) When cooling the container 30 to, for example, −10° C. (by means of the accumulator 5b) the container volume is reduced all the time, and the pressure does not reach the bearing pressure of 3.6 atm., but the bell 13 will descend to its bottom position. When the circulation pump 34 is started heating of the refrigerant 31 (which has condensed during the cooling) causes evaporation thereof, the bearing pressure soon being obtained and the increasing volume upwardly directed work of the gas bell 13. At the top position the circulation pump 34 is stopped and fans 38 and 39 are started, thereby starting the cooling and condensation of the refrigerant gas until the temperature again is about −10° C., whereupon a new cycle is started, and so on. When the outdoor temperature is lower than −10° C. the capacity of the fan 38 can be increased for accumulating excess of cooling capacity (=withdrawal of energy) for the needs during warmer days.

The above described device can produce considerable amounts of useful energy, for example electrical energy, using normally useless low temperature heat energy. For example, a bell 13 of 10 m$^3$ operated at the above indicated conditions and working at a rate of 100 cycles per hour can yearly produce about 250,000 kWh of electrical energy by cooling of heat of 0° C. to −10° C. (In this example the losses caused by the necessary fans and pumps and the conversion to electrical energy have also been considered.)

The working principle will, of course, be the same when the container 30 is surrounded by a liquid, in which case the motion of the piston 30 is used for pumping a liquid through suitable valves. In both cases the work created by low temperature heat energy is utilized for producing the desired form of useful energy, which can take place in many different ways, well known to a person skilled in the art.

FIG. 3 shows one example of such an embodiment of the invention, i.e. when the work of the expansible and compressible containers is used for pumping a liquid. FIG. 3 shows two expansible and compressible working containers 30a and 30b which are placed in chambers 14a and 14b respectively, each of which is filled with a liquid. In this embodiment the containers 30a and 30b do not only comprise the expansible and compressible parts, but also further "container parts" which in FIG. 3 are designated 41 and 42 and which are arranged in direct heat exchanging contact with the relatively warmer accumulator 5a and the relatively cooler accumulator 5b respectively. The containers 41 and 42 need not be containers in the proper sense, but they represent the entire conduit systems (tubing, tubes, etc.) providing for heat exchange with the accumulator masses 5a and 5b respectively. Thus, the expansible and compressible parts 30a and 30b, together with said conduits 41 and 42, form closed systems, wherein a refrigerant 31 alternatingly passes from gas phase to liquid phase as described above. In the embodiment of FIG. 2 the heat exchange between the refrigerant and the accumulators 5a, 5b takes place indirectly via heat carrying fluids (circulating through the conduits 32 and 37), whereas in the case of FIG. 3 there is a direct heat exchange with the accumulator masses 5a, 5b, resulting in increased efficiency. The liquid phase 31 is concentrated to the spaces 41 and 42, whereas the expansible and compressible parts 30a and 30b contain at all times the gas phase of the refrigerant, of varying pressure and temperature.

In the embodiment of FIG. 3 the two container parts 30a and 30b are connected to the container parts 41 (the comparatively warm container part) and 42 (the comparatively cold container part) respectively by means of an adjustable valve 45. When this valve is in the position marked by full line arrows in FIG. 3, there is a high pressure of vaporized refrigerant inside the "warm" container part 41 and the corresponding container part 30b. The container 30b then expands and forces water (corresponding to the volume increase of the container) to escape from the chamber 14b through a non-return valve 46b. In the same working position for the valve 45 the container part 30a communicates with the "cold" spaces 42 in the accumulator 5b. In said spaces the refrigerant has been condensed to liquid form with a resulting decrease of the pressure in the container 30a. Because of the pressure decrease the liquid is compressed, causing water to flow into the chamber 14a via a non-return valve 47a. If the chamber 14a is located, as shown, in a water mass 50, then the static pressure to the water surface also contributes to the pumping of the water into the chamber 14a.

In the illustrated case a smaller liquid pump 43 is used for returning the condensed refrigerant from the spaces 42 to the spaces 41 located in the "warm" accumulator 5a. This pump can be operated in several alternative ways. For example, a steam turbine or steam motor 49 may be provided, which is driven by the pressure and temperature differences, between the refrigerant vapors in the two spaces 41 and 42. In the illustrated case the steam motor 49 is located between the valve 45 and the "colder" space 42 for optimal use of the expansion work of the pressure and temperature fall when cooling the refrigerant vapors in the working containers 30a and 30b. The motor 49 can, for example, operate an electric generator 44, which in turn can feed the pump 43.

When water has been pumped out from the chamber 14b and sucked up into the chamber 14a the valve 45 is switched to the position indicated by dashed line arrows in FIG. 3. The water container 30a is then connected to the "warm" accumulator spaces 41, whereas the working container 30b is connected to the "cold" accumulator spaces 42, whereby water is expelled from the chamber 14a via a non-return valve 46a, whereas water is sucked up into the chamber 14b via a non-return valve 47b. Water that has been pumped out can, for example, be collected in a common conduit 48. The kinetic energy of the flowing water can be transformed into the desired form of energy such as electrical energy, by means of means and methods which are well known per se. By repeated switching of the valve 45 as described there is obtained a machine (in the specific case a water pump) which continuously performs work as long as a minor temperature difference (chosen with regard to the refrigerant used) can be maintained between the accumulators 5a and 5b. The "warm" accumulator 5a then continuously vaporizes the refrigerant 31, thus permanently providing a "supply" of refrigerant gas of a desired pressure. Similarly condensation continuously takes place in the "cold" accumulator 5b, a continuous working process being obtained by returning the condensate to the "warm" accumulator 5a.

Although a few specific embodiments of the invention have been shown and described above, it will be apparent that other forms thereof are possible. Thus, the foregoing shall be taken merely as illustrative and not as limitating.

What I claim is:

1. A device for converting low temperature heat energy into mechanical energy, comprising:
   at least one chamber containing a working fluid for performing work in response to temperature variations;
   at least one container having at least one expansible and compressible part, said at least one container part being disposed in said working fluid;
   at least one first and at least one second heat accumulator, each arranged to store and deliver heat by melting and freezing ice, said at least one second accumulator having an agent therein to depress the freezing point thereof to a temperature lower than the freezing point in said at least one first accumulator; and,
   a refrigerant disposed in said container, capable of shifting between liquid and gas phases and in heat exchanging contact with said at least one first and second accumulators for expanding and contracting said expansible and compressible container part depending upon the temperature thereof, said refrigerant being arranged to alternately be supplied with heat from said at least one first accumulator, being vaporized thereby so as to perform work by expansion of said at least one container part, and be cooled by said at least one second accumulator, being thereby condensed so as to perform work by contracting said at least one container part, whereby mechanical energy is imparted to said working fluid by the expansion and contraction of said at least one container part.

2. A device according to claim 1, further comprising: a system of heat exchange tubes in heat exchanging contact with said at least one first accumulator and disposed in said at least one container, being immersed in said refrigerant; and, a heat carrying fluid circulating in said system of heat exchange tubes.

3. A device according to claim 1, wherein, during cold ambient temperature conditions, the freezing point of said at least one first accumulator is approximately 0° C. and the freezing point of said at least one second accumulator is not greater than approximately −10° C.

4. A device according to any claim 1, wherein said refrigerant is a halogenated hydrocarbon.

5. A device according to claim 1, wherein said at least one expansible and compressible container part can be expanded and compressed without any significant self-resistance.

6. A device according to claim 1, wherein the expansion and contraction of said at least one container part affects the surrounding working fluid, which is thereby driven to perform mechanical work.

7. A device according to claim 6, further comprising means for converting said mechanical work into electrical energy.

8. A device according to claim 1, wherein said at least one container part comprises a piston/cylinder assembly.

9. A device according to claim 1, wherein said at least one expansible and compressible container part comprises thin plastic material.

10. A device according to claim 9, wherein said at least one plastic container part comprises a plurality of folds.

11. A device according to claim 9, wherein said at least one plastic container part comprises a plurality of gussetts.

12. A device according to claims 1 or 9, wherein said at least one container part comprises a bellows.

* * * * *